(12) United States Patent
Visan et al.

(10) Patent No.: US 7,630,520 B2
(45) Date of Patent: Dec. 8, 2009

(54) METHOD AND SYSTEM FOR DOCUMENT COMPARISON USING CROSS PLANE COMPARISON

(75) Inventors: Tiberiu Visan, Ottawa (CA); David Giles O'Neil, Ottawa (CA); Gregory John Brown, Richmond (CA)

(73) Assignee: Canadian Bank Note Company, Limited, Ottawa (CA)

( * ) Notice: Subject to any disclaimer, the term of this patent is extended or adjusted under 35 U.S.C. 154(b) by 677 days.

(21) Appl. No.: 11/496,381

(22) Filed: Jul. 31, 2006

(65) Prior Publication Data

US 2008/0025556 A1 Jan. 31, 2008

(51) Int. Cl.
*G06K 9/00* (2006.01)

(52) U.S. Cl. .................. 382/112; 382/100; 382/135; 382/137

(58) Field of Classification Search ............. 382/100, 382/112, 135, 137, 165, 181
See application file for complete search history.

(56) References Cited

U.S. PATENT DOCUMENTS

| | | | |
|---|---|---|---|
| 5,363,454 A * | 11/1994 | Udagawa et al. ............. | 382/165 |
| 6,519,362 B1 * | 2/2003 | Cusmariu ................... | 382/176 |
| 7,054,461 B2 | 5/2006 | Zeller et al. | |
| 2002/0006220 A1 * | 1/2002 | Kohchi ..................... | 382/165 |
| 2006/0102843 A1 | 5/2006 | Bazakos et al. | |

OTHER PUBLICATIONS

Otsu, Nobuyuki, "A Threshold Selection Method from Gray-Level Histograms," IEEE Transactions on Systems, Man, and Cybernetics, vol. SMC-9, No. 1, Jan. 1979, pp. 62-66.

* cited by examiner

*Primary Examiner*—Tom Y Lu
(74) *Attorney, Agent, or Firm*—Crompton, Seager & Tufte, LLC

(57) ABSTRACT

The invention relates to the field of document authentication and more specifically to an apparatus and method for validating an enhanced feature contained in a document under analysis. More specifically, a cross plane comparison is used within a document comparison system to validate the authenticity of a security document. Two images are extracted from two color-planes (e.g. visible light and infrared) of a specified page of a security document and the presence/absence of a pattern or text in each plane is determined. In operation, the security document is exposed to two light sources and grey scale images are extracted. Binary images are then obtained from the grey scale images by filtering each grey scale image and then thresholding each grey scale image. The difference between the two binary images is then calculated to determine if a pattern or text is present in both planes or only in one plane. A confidence score is determined from the difference and is presented to an operator of the document comparison system.

25 Claims, 16 Drawing Sheets

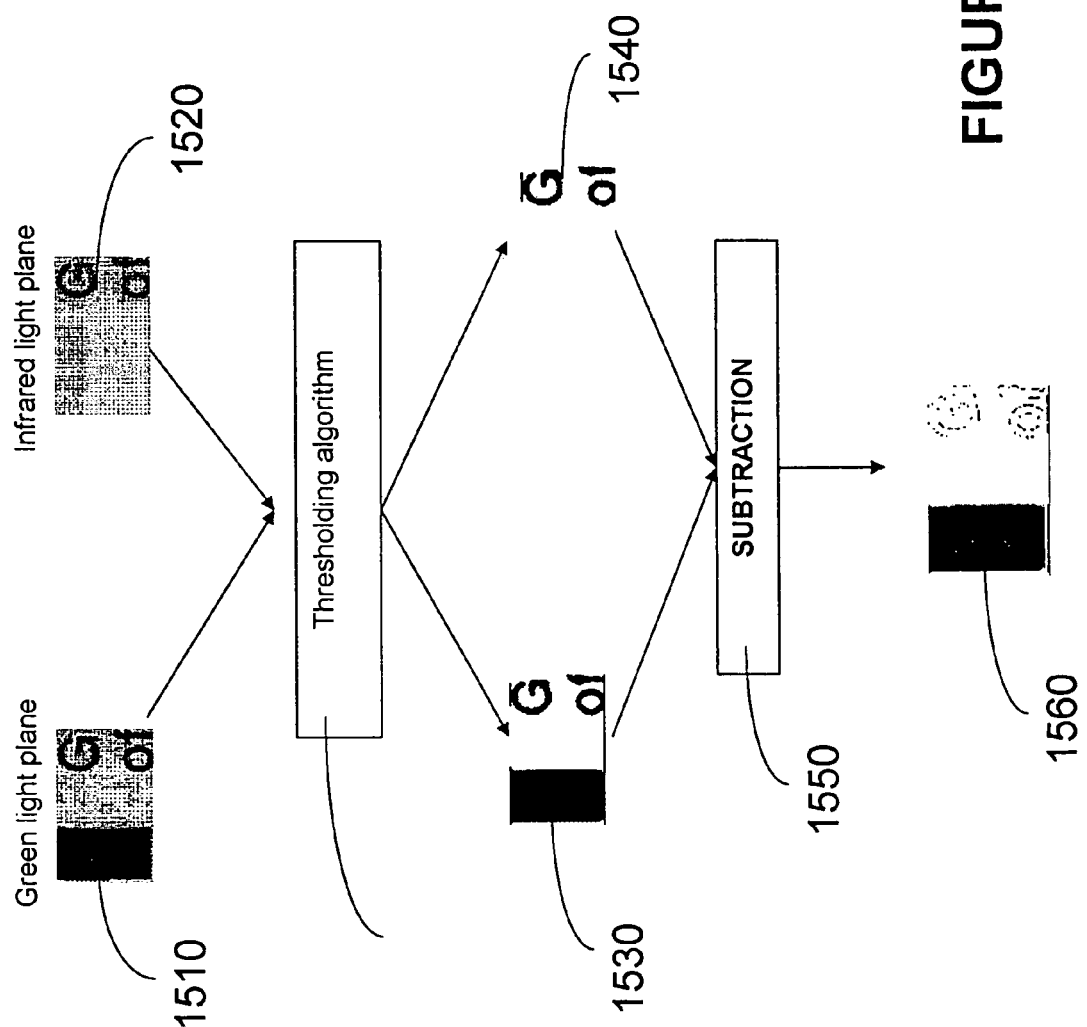

METHOD AND SYSTEM FOR DOCUMENT COMPARISON USING CROSS PLANE COMPARISON

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The invention relates to the field of document authentication and more specifically to an apparatus and method for validating an enhanced feature contained in a document under analysis.

2. Description of the Related Prior Art

Forgery of high value identification documents is a growing concern, especially in light of increased security threats worldwide. Identification documents may include, but are not limited to, passports, VISA and identification cards. In order to counter attempts to forge such identification documents, a variety of security features have been incorporated therein. Such security features include ultraviolet (UV) threads, infrared (IR) printing, watermarks, micro printing, specialized laminates, machine-readable code and the like. As will be appreciated by those in the art, the security features on a given identification document, such as a passport, will vary between countries and even within a country based on the date of issue. As will also be appreciated, such features are normally detected and verified by a document reader, various brands of which are widely available in the market.

Despite all of the above measures to prevent counterfeiting, forged documents continue to be developed which mirror authentic documents and which therefore escape detection by such document readers or their associated operators. In order to address this deficiency, a superior security feature along with an apparatus and method for detecting such a security feature is required.

SUMMARY OF THE INVENTION

In order to overcome the deficiencies of the prior art there is provided a cross plane comparison feature used in validating the authenticity of a security document. More specifically, a cross plane comparison is used within a document comparison system to validate the authenticity of a security document. Two images are extracted from two colour planes (e.g. visible light and infrared) of a specified page of a security document and the presence/absence of a pattern or text in each plane is determined. In operation, the security document is exposed to two light sources and grey scale images are extracted. Binary images are then obtained from the grey scale images by filtering each grey scale image and then thresholding each grey scale image. The difference between the two binary images is then calculated to determine if a pattern or text is present in both planes or only in one plane. A confidence score is determined from the difference and presented to an operator of the document comparison system. The confidence score is, in one embodiment, determined by the comparison of the difference to an expected result stored in a database associated with the document comparison system. In a second embodiment, the confidence score is determined from the difference according to a predetermined transfer function.

In accordance with one aspect of the invention there is provided in a document comparison system having a document reader communicating with a document inspection engine, a method of performing cross plane comparison, comprising: extracting a first image from a first colour plane of a specified page of a security document; extracting a second image from a second colour plane of said specified page of said security document; obtaining respective binary images from said first and second extracted images; subtracting said respective binary images to determine a difference; determining a confidence score from said difference; and presenting said confidence score to an operator of said document comparison system on an inspector GUI.

Preferably, the first and second extracted images are first and second grey scale images comprising a plurality of pixels, and wherein each of the plurality of pixels has an associated grey scale value, and wherein each of the first and second grey scale images have a foreground and a background.

More preferably, the step of obtaining further comprises filtering artifacts from the first and second grey scale backgrounds with a low pass filter, and then thresholding said first and second grey scale images.

In accordance with a second aspect of the invention, there is provided a document comparison system for validating the authenticity of a security document comprising: a first graphical user interface for building a template associated with said security document; a knowledge base for storing said template; a document inspection engine for performing cross plane comparison, wherein said cross plane comparison comprises: (i) extracting a first image from a first colour plane of a specified page of a security document; (ii) extracting a second image from a second colour plane of said specified page of said security document; (iii) obtaining respective binary images from said first and second extracted images; (iv) subtracting said respective binary images to determine a difference; and (v) determining a confidence score from said diferrence; and a second graphical user interface for presenting said confidence score to an operator.

The advantage of the invention is now readily apparent. Using the enhanced validation feature, a higher level of assurance regarding the authenticity of a security document can now be obtained.

Further features and advantages of the invention will be apparent from the detailed description which follows together with the accompanying drawings.

BRIEF DESCRIPTION OF THE DRAWINGS

A better understanding of the invention will be obtained by considering the detailed description below, with reference to the following drawings in which:

FIG. 15 depicts a first example of the cross plane presence/absence technique where a selected feature is present in both planes.

DESCRIPTION OF THE PREFERRED EMBODIMENT

Figure 1:
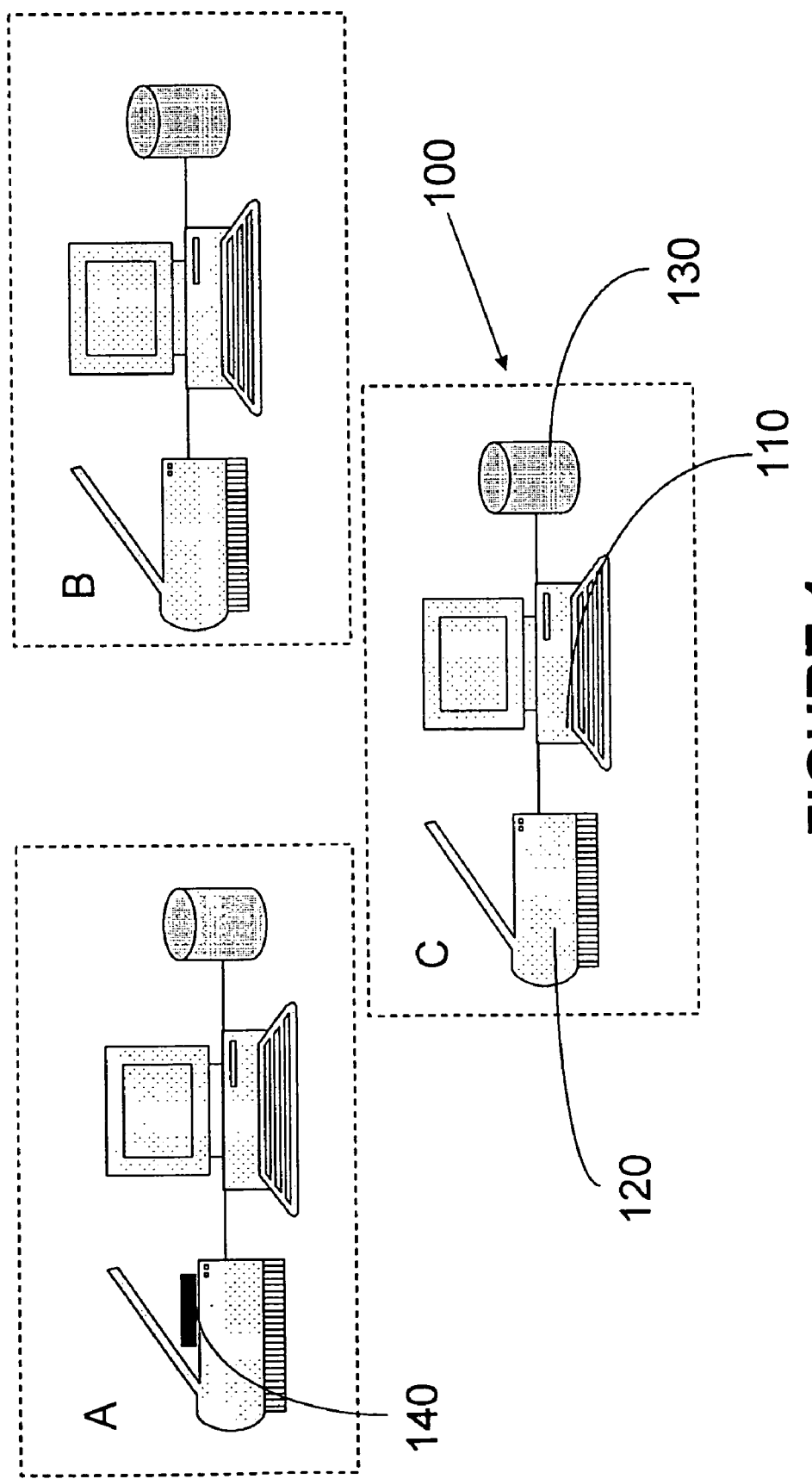
FIG. 1 depicts a stand alone document comparison system.

Referring to FIG. 1, an overview of the document comparison system (DCS) (shown generally at 100) in which the present invention functions is provided. The DCS 100 is comprised of a general purpose computer 110 which may utilize, for example, a Windows XP™ operating system produced by Microsoft™ Corporation. The general purpose computer includes a monitor, input device such as a keyboard and mouse, hard drive and processor, such as an Intel™ Pentium™ 4 processor, cooperating with the operating system to coordinate the operation of the aforementioned components. As those in the art will appreciate, general purpose computer 110 could be any commercially available, off-the shelf computer including a laptop or similar device and all such devices are meant to be included within the scope of the present invention.

General purpose computer 110 communicates with travel document reader 120 and external storage device 130. As will be appreciated by those in the art, data stored in external storage device 130 may be alternately stored on the hard drive integral to general purpose computer 110. Travel document reader 120 is used to input features associated with a security document 140 (such as a passport, visa, identity card, etc.) into DCS 100 for analysis, to assist the operator with a determination as to whether security document 140 is authentic. In operation, the operator places security document 140 onto an image capture surface associated travel document reader 120 and a portion or all of security document 140 is then exposed to various light sources. Travel document reader 120 is designed to recognize documents that are compliant with the relevant standards and specifications governing such documents. These specifications and standards may be set by the authorities which issue these documents as well as international organizations such as the ICAO (International Civil Aviation Organization). As part of the image capture process, the security document 140 may be exposed to various forms of light such as ultraviolet (UVA and UVB), infrared (IR), red/green/blue (RGB) and white light to determine if certain expected features are present. More specifically, light emitting diodes (LEDs) expose security document 140 to UV, IR and RGB light, while a fluorescent light source exposes security document 140 to white light. In all cases, the light reflected from the surface of security document 140 is captured by a charge coupled device (CCD) or complementary metal-oxide semiconductor (CMOS) sensor, either of which converts the light into electronic signals that can be digitally processed.

Figure 2:
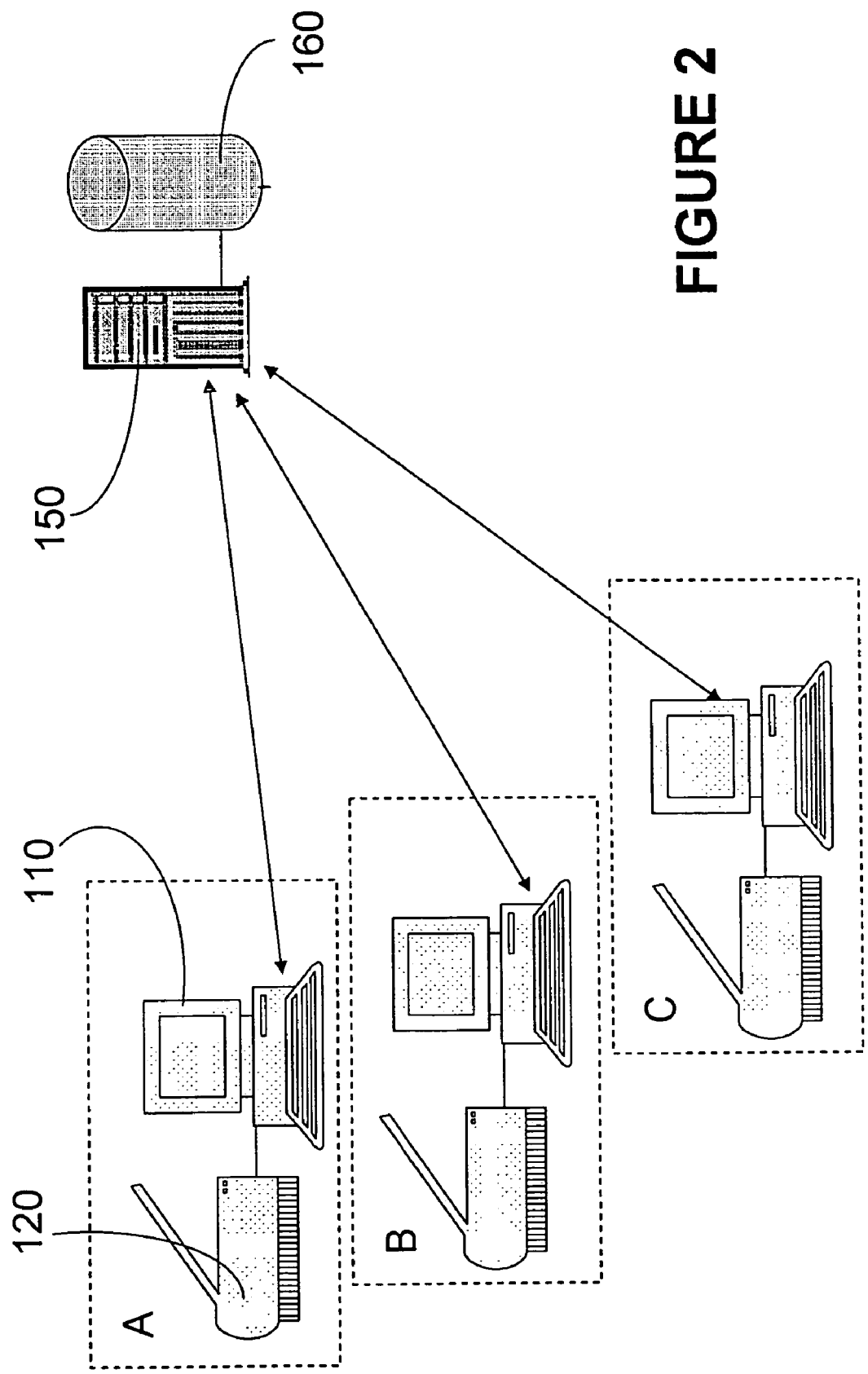
FIG. 2 depicts a networked document comparison system.

In the configuration shown in FIG. 1, document comparison system 100 operates in a stand alone mode at locations A, B and C such as at a customs or security officer's post located at, for example, an airport or other country point of entry. As shown in FIG. 2, an alternate configuration includes each of a plurality of general purpose computers 110 communicating with a central server 150 in a client-server relationship well known to those in the art. Central server 150 communicates with a central storage device 160.

General purpose computer 110 has stored thereon, document comparison software, which processes the captured information and compares it to information contained in local security feature/image database 130, to determine if security document 140 is authentic. Alternatively, document comparison software could be stored on central server 150 and accessed by each of the plurality of general purpose computers 110 attached thereto. As will be appreciated by those in the art, travel document reader 120 typically firmware for accomplishing various reader specific tasks such as acknowledging receipt of security document 140 onto the scanning surface and capturing various the images discussed above. This firmware operates seamlessly with the document comparison software in the analysis of security document 140. More specifically, the firmware associated with travel document reader 120 sends and receives requests for information related to a specified document template, as will be discussed in more detail below.

Figure 3:
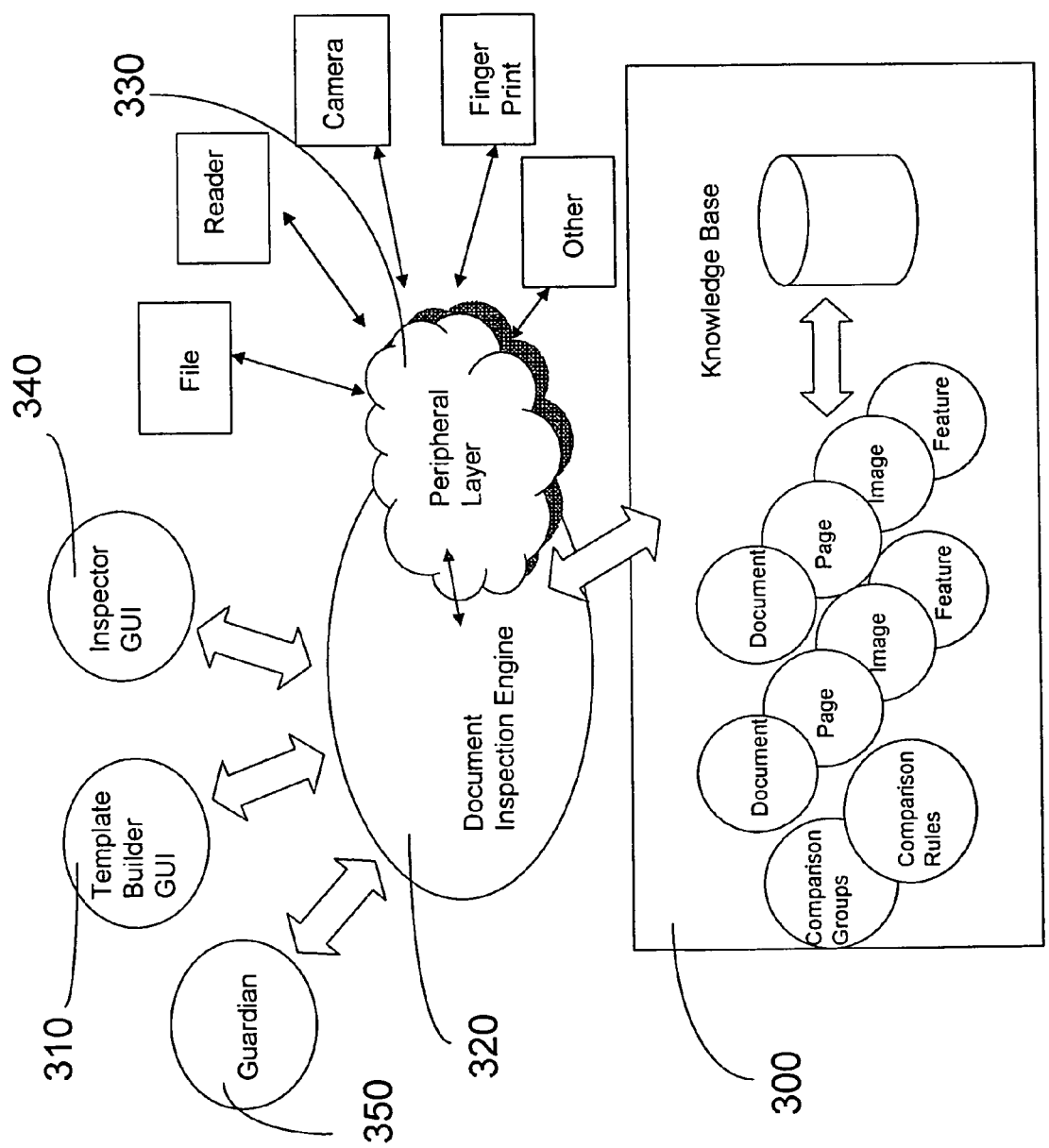
FIG. 3 depicts the software components of the document comparison system.

Document comparison software is comprised of several modules as depicted in FIG. 3. One such module is knowledge base 300. DCS 100 uses knowledge base 300 to perform its inspection tasks. Knowledge base 300 (the contents of which are stored in storage devices 130 or 160) contains known templates for a variety of security documents 140 that are identified by a document signature. Each template holds the instructions on what and how to locate, process, inspect, compare and score the various entities on the template. The document content is arranged in a hierarchical manner so as to facilitate cross document, cross page, cross image, and same document, same page, same image inspections. The elements of knowledge base 300 are further defined as follows:

(a) Portfolio: A collection of logically related documents. An example might be a complete collection of a person's travel documents. These might include his or her passport, boarding pass, fingerprints and photo. Properties and comparison groups (defined below) can be attached to a portfolio;

(b) Document: A collection of page(s) or data groups to be inspected. An example might be the passport page and visa page. Properties and comparison groups can be attached to a document;

(c) Page: A logical grouping of images or binary representations of data. A page can have properties to be inspected, e.g. page size;

(d) Image: A binary data representation of an entity that has feature(s) to be inspected, e.g. captured with a different light source to expose certain features;

(e) Feature: A significant object within the image entity, e.g. MRZ (machine readable zone) feature, a Maple Leaf pattern. A feature knows how to locate, process and score parts of or the entire image. Properties can be attached to a feature.

(i) Signature features (to be discussed below) have an added functionality for selecting templates;

(ii) Self-learning features have the ability to locate and identify most or all of their properties. Such features can use processors and comparators to help with this process;

(f) Property: An element within an entity that can be inspected and scored, e.g. location, colour or text;

(g) Comparison Rule: A rule has an operator that is applied to two properties;

(h) Comparison Group: A collection of comparison rules to form more complex rules to perform extra checking on the security document 140. The comparison group has an optional activation and deactivation time. An example of a comparison group is to alert the operator that all male travelers, aged between 25-40 of country UTO are to be asked for a second piece of identification during the period of Apr. 1 to Apr. 2, 2005;

(i) Signature: A special property that is a unique identification of an entity (e.g. document, page, image or feature) within an entity group. The document type, country code and the document series id could form a document signature.

Figures 4A, 4B:
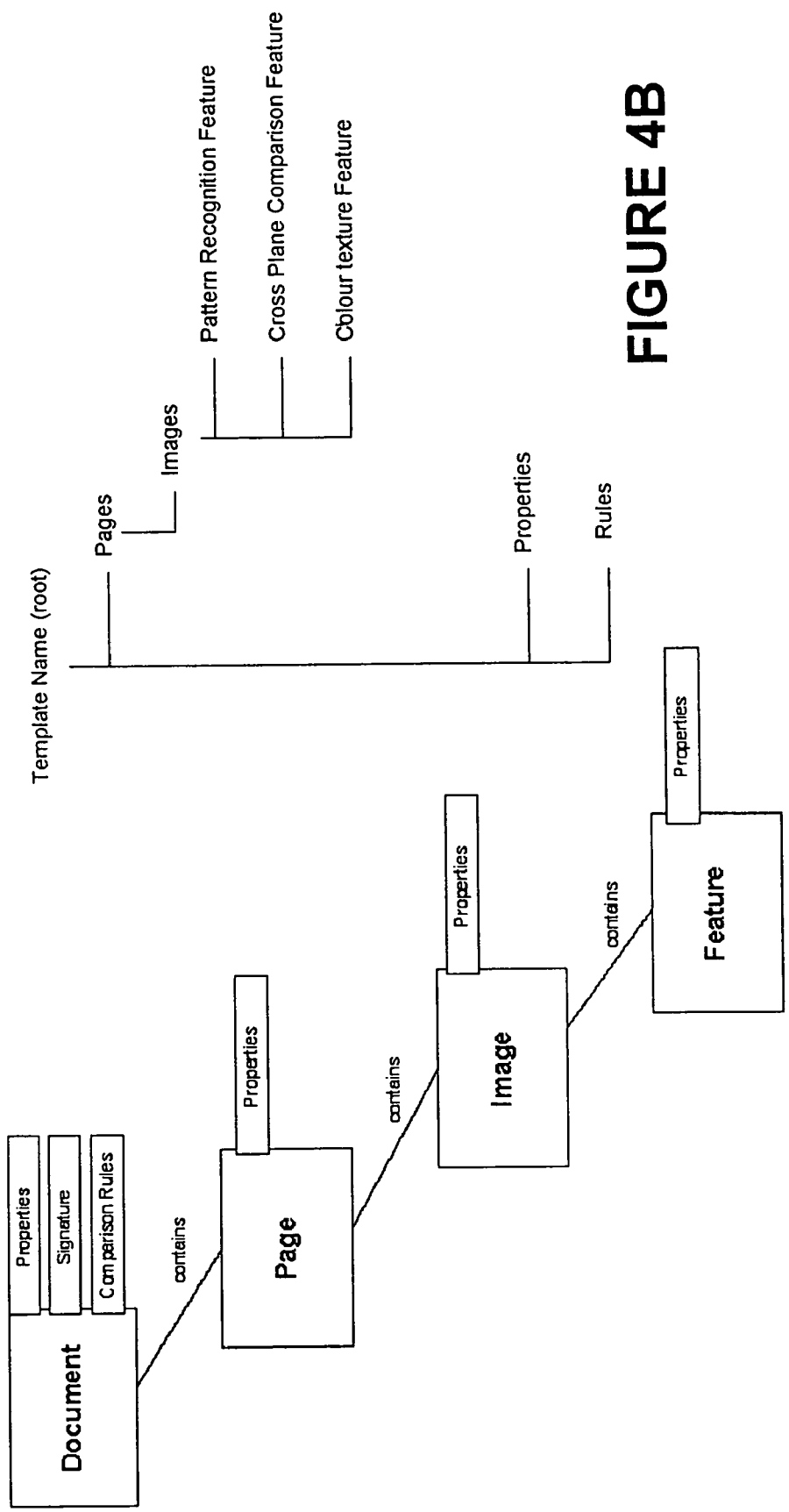
FIG. 4A depicts the hierarchical organization of the elements of the knowledge base.
FIG. 4B depicts an example of a document template and a number of image features associated therewith.

The hierarchical arrangement of the above-noted elements is depicted in FIG. 4A, with an example of a document template and a number of image features associated therewith depicted in FIG. 4B.

Another module contained in the document comparison software is a template builder graphical user interface (GUI) 310 for assisting the user of DCS 100 with the management of knowledge base 300 and its associated templates. Template builder GUI 310 allows the creation, deletion and renewal of the data that represents a document template. This basic functionality of template builder GUI 310 can either be done in a step-by-step manner for specific entities within a document template or the user can have the tool create a generic layout of a document template with default values. Template builder GUI 310 also provides an interactive visual representation of the hierarchal data in knowledge base. This allows the user to easily scan various document templates contained within knowledge base 300 and quickly apply those changes that are required.

Figure 5:
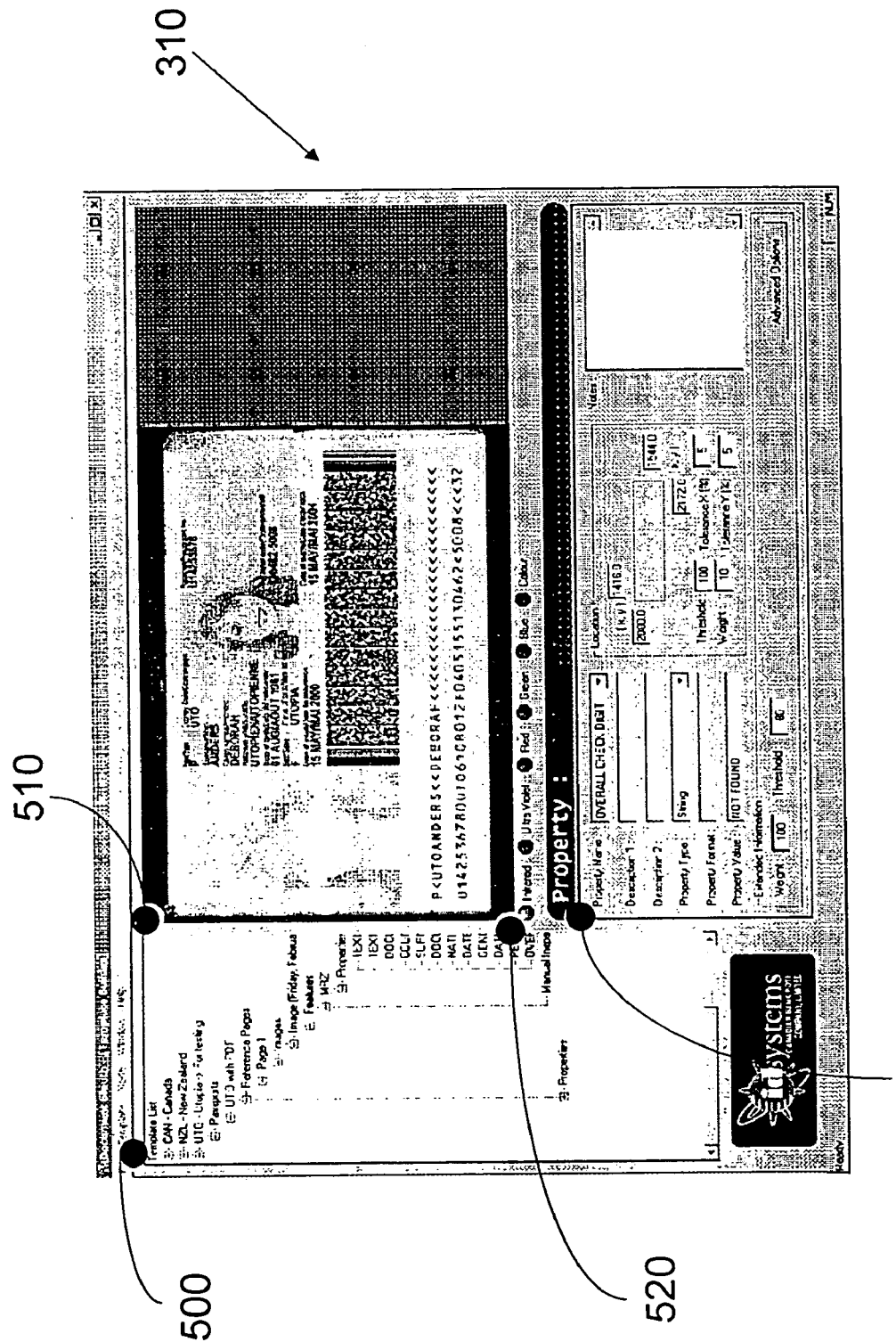
FIG. 5 depicts a template builder graphical user interface (GUI)

Referring to FIG. 5, a template builder GUI 310 is depicted. Window 500 is the previously mentioned hierarchal representation of the existing templates in knowledge base 300. The commands for adding, removing and maintaining templates are instigated from this tree list. Visual display area 510 provides the user with a representation of the data with which the user is currently working. This could be graphical, binary, etc. Indicator lights 520 inform the user what data source the current data was obtained from during template creation. Finally, data entry fields 530 provide information for each of the different types of entities that make up a template. Template builder GUI 310 dynamically changes the set of fields for data entry depending on which entity is being manipulated. These entities include properties, features, images, reference pages, documents, rules, and portfolios previously discussed.

Referring again to FIG. 3, a further module of the document comparison software is a document inspection engine 320 that works in collaboration with knowledge base 300 to score a document or portfolio of documents based on inspection instructions. Document inspection engine 320 may alternately reside in document authentication server 150 and obtain images from one or more security documents 140 scanned at one or more networked travel document readers 120. As shown in FIG. 3, travel document reader 120 is just one example of the devices that reside in peripheral layer 330, with which document inspection engine communicates to obtain inspection data.

When security document 140 is inserted into travel document reader 120 it automatically sends signature image(s) and/or signature feature(s) to the document inspection engine 320. Signature image(s) and/or signature feature(s) are used to determine a document type (e.g. passport) upon which further validation processing can be initiated. More specifically, using the retrieved signature images(s) and/or signature feature(s) document inspection engine 320 determines one or more matching templates. Each template defines the additional data to be retrieved using travel document reader 120 to validate security document 140.

Figure 6B:
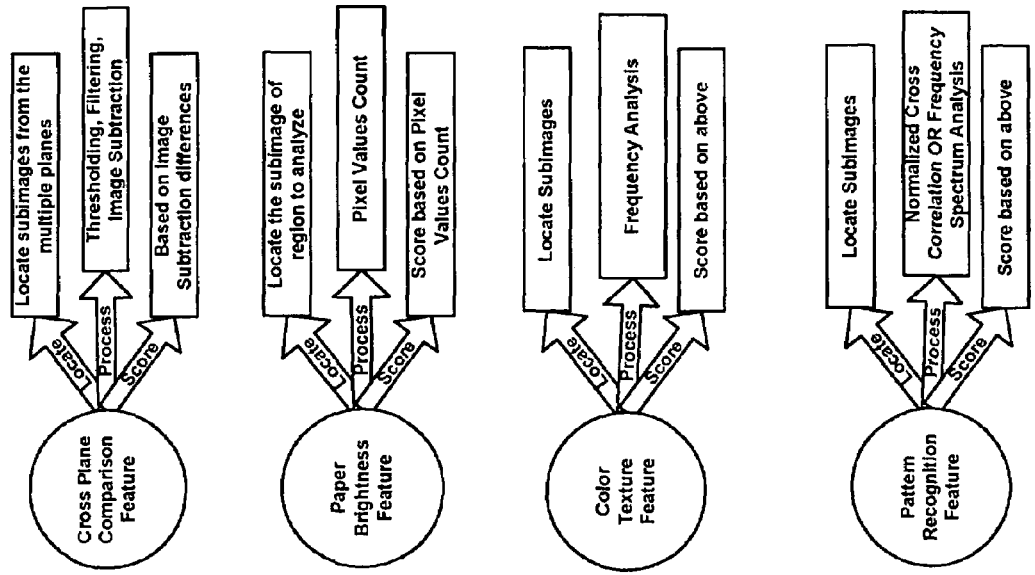
FIG. 6B depicts a series of example features used to validate an identified security document.
Figure 6A:
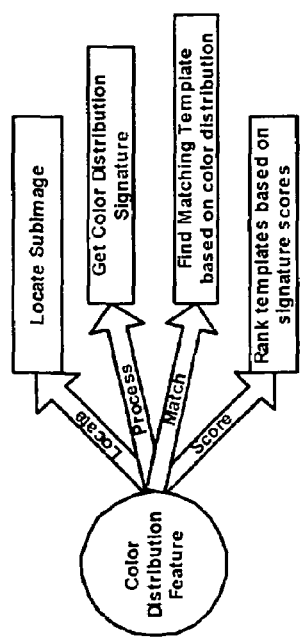
FIG. 6A depicts an example signature feature used by the document inspection engine to identify the security document under consideration.

Important enablers for matching templates are signature features. Generally speaking, document inspection engine 320 can locate, process and score features, but signature features also implement a "find matching templates" process. The "find matching templates" process calculates a unique signature for the security document 140 under analysis. This process preferably utilizes a scoring mechanism which ranks the matching templates. From the list of ranked matching templates, the highest scored template is chosen, and this template will be used in the validation of the security document 140 under analysis. Optionally, an operator can select the preferred template from the list. FIG. 6A depicts an example of a signature feature that looks at the colour distribution of sub images to calculate a unique signature for an incoming image. This signature is used to search, score and rank matching templates.

Once the security document 140 under analysis is identified, additional features associated with security document 140 are located, processed and scored by document inspection engine 320 to determine if security document 140 is authentic. Feature locating, processing and scoring are most commonly methods exported from image and data processing libraries or DLLs. For example a machine readable zone (MRZ) feature uses an image utility for page segmentation and a multi font OCR engines will be called to recognize the letters. MRZ scoring is based on advanced comparators and libraries that have been developed according to ICAO standards. Another example is a pattern recognition feature that locates sub images and uses a normal cross correlation algorithm which generates a number used for scoring. FIG. 6B depicts example features which are located, processed and scored as part of the validation process for security document 140.

When all data is received for security document 140, document inspection engine 320 starts the scoring process. The hierarchical structure of knowledge base 300 is key to this process. Scoring security document 140 is a user-weighted summary of scoring all pages, all comparison groups and all properties attached to security document 140. Scoring pages is a user-weighted summary of scoring all data, images and scoring all properties attached to the page. Scoring data and images is a user-weighted summary of scoring all features and properties attached to the page. To score a feature it must first be located then processed before scoring is performed. Scoring a feature involves a user-weighted summary of all properties, property locations and feature location scores. As will be discussed in relation to FIGS. 7A and 7B, the results of the scoring are displayed in an inspector GUI (element 340 in FIG. 3)

Figure 7A:
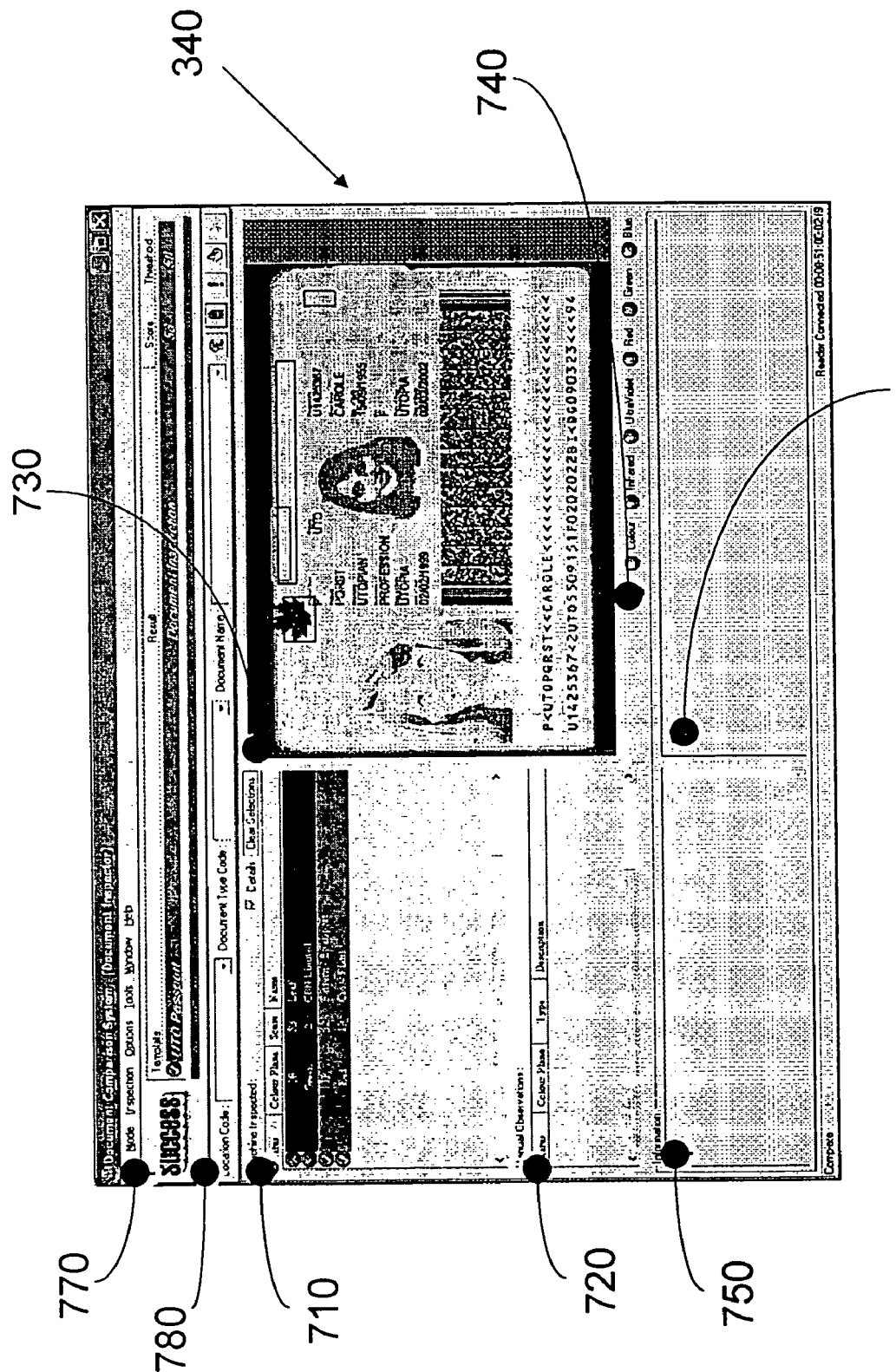
FIG. 7A depicts an inspector GUI.

Referring to FIG. 3 and 7A to 7C, the last major module of the document comparison software is inspector GUI 340. At the end of the inspection process, the inspection results are presented via the inspector GUI 340 to an operator such as a customs officer. As shown in FIG. 7A, inspector GUI 340 includes: a list of machine inspected features 710, properties and rules where the results are signified by colour and a numerical score; a list of important features 720 that the user needs to be aware of but cannot be processed and inspected electronically by DCS 100; an image display area where those items listed in 710 and 720 are boxed on the image; a set of buttons 740 indicating what colour planes were obtained and inspected for the template; a text information pane 750 that displays relevant notes pertaining to the item selected from either 710 or 720; a visual information pane 760 that displays relevant images pertaining to the item selected from either 710 or 720.

Figure 7B:
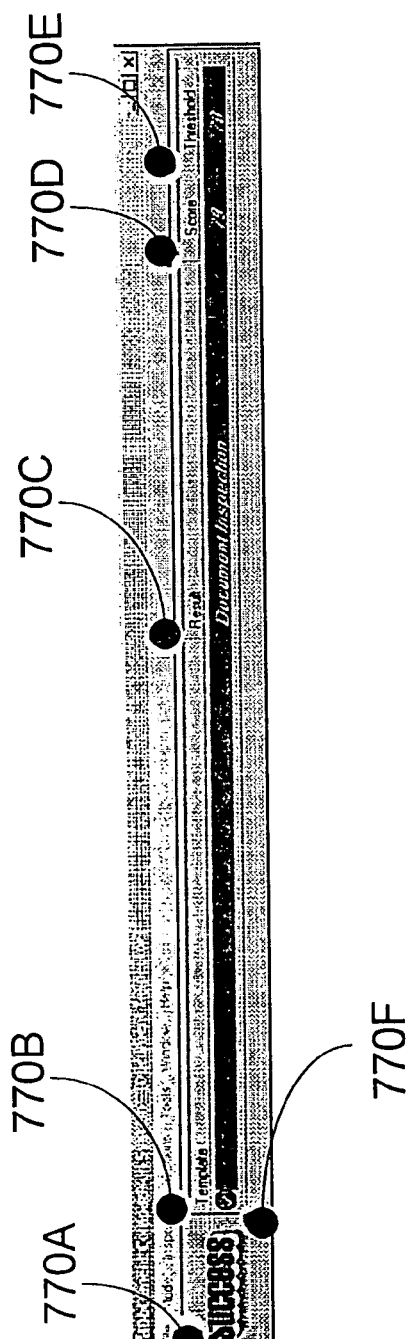
FIG. 7B depicts the display bar of the FIG. 7A inspector GUI.
Figure 7C:
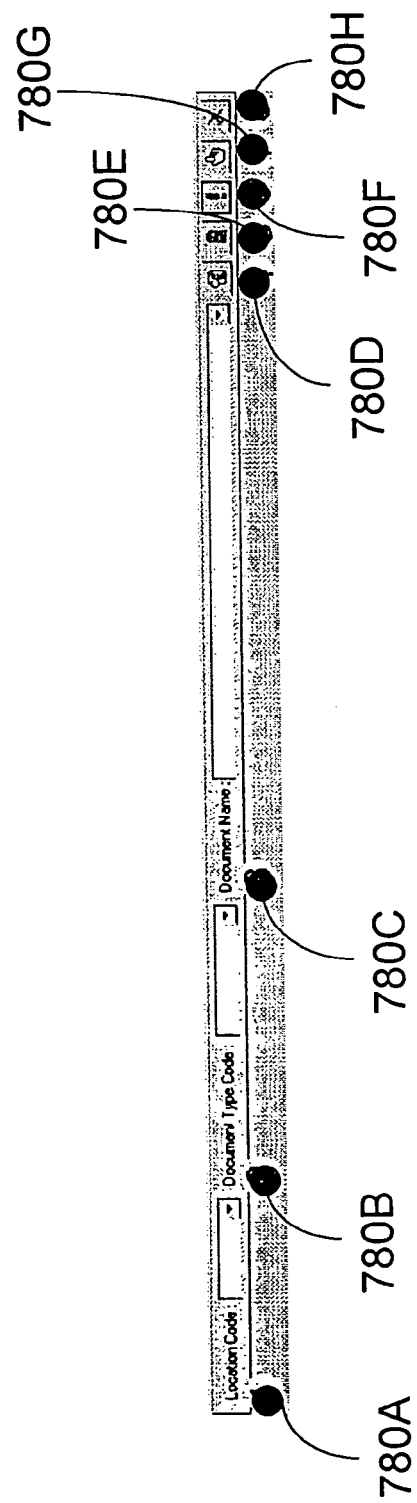
FIG. 7C depicts the search bar of the FIG. 7A inspector GUI.

Additionally, inspector GUI 340 includes a display bar 770. As shown in FIG. 7B display bar 770 includes: a large bold single word 770A, which is easy to see and interpret quickly to indicate the status of the last operation performed; the name of the document template 770B that was used during the last document inspection process; a single sentence 770C highlighting any important information the user may need to know about the last operation that was performed; a numerical score 770D that relates a confidence level of all computations performed on the inspected document in relation to the chosen document template; a numerical value 770E indicating the threshold limit for passing or failing the inspection process; and a progress bar 770F (shown in pre-inspection mode) that is activated during the inspection process to indicate to the user that an operation is taking place.

Finally, inspector GUI includes a search bar 780. As shown in FIG. 7B, search bar 780 includes: location code entry 780A to specify what country, province, county or any other similar geopolitical designation to which a document template belongs; document type code entry 780B to specify to what set of documents the template belongs. Examples include visa, passport, financial card and identifying certificates; document name entry 780C to specify the exact name of the document template that the user may desire to use for an inspection; a "Browse" button 780D, which utilizes the information from the three above-mentioned entry fields to display template information in the main inspection window; a "Clear" button 780E, which clears all data retrieved from the knowledge database 300 from the screen; an "Execute" button, 780F which utilizes the information from the above-mentioned entry fields while instigating an inspection process for acquired images; an "Auto-Selection" button 780G, which turns ON or OFF the option of the user to select a template during the inspection process when a perfect template match cannot be acquired. In the ON state a list of templates is presented to the user for use. In the OFF state the best match template is used for the inspection process; and a "Cancel" button 780H, which interrupts and stops an inspection process before it is complete As depicted in FIG. 3, an optional module of the document comparison software includes a guardian component 350 which assigns user access privileges to view and modify knowledge base 300 when either template builder GUI or inspector GUI 340 are in use. A user with insufficient privileges is denied access to certain areas of knowledge base 300 in template builder mode or to certain results in inspection mode. For example, if the system administrator does not want the user to even be aware that a certain feature for a specified document exists and can be analyzed then access to that feature in knowledge base 300 will be denied and the results of that feature analysis will remain hidden.

Figure 8:
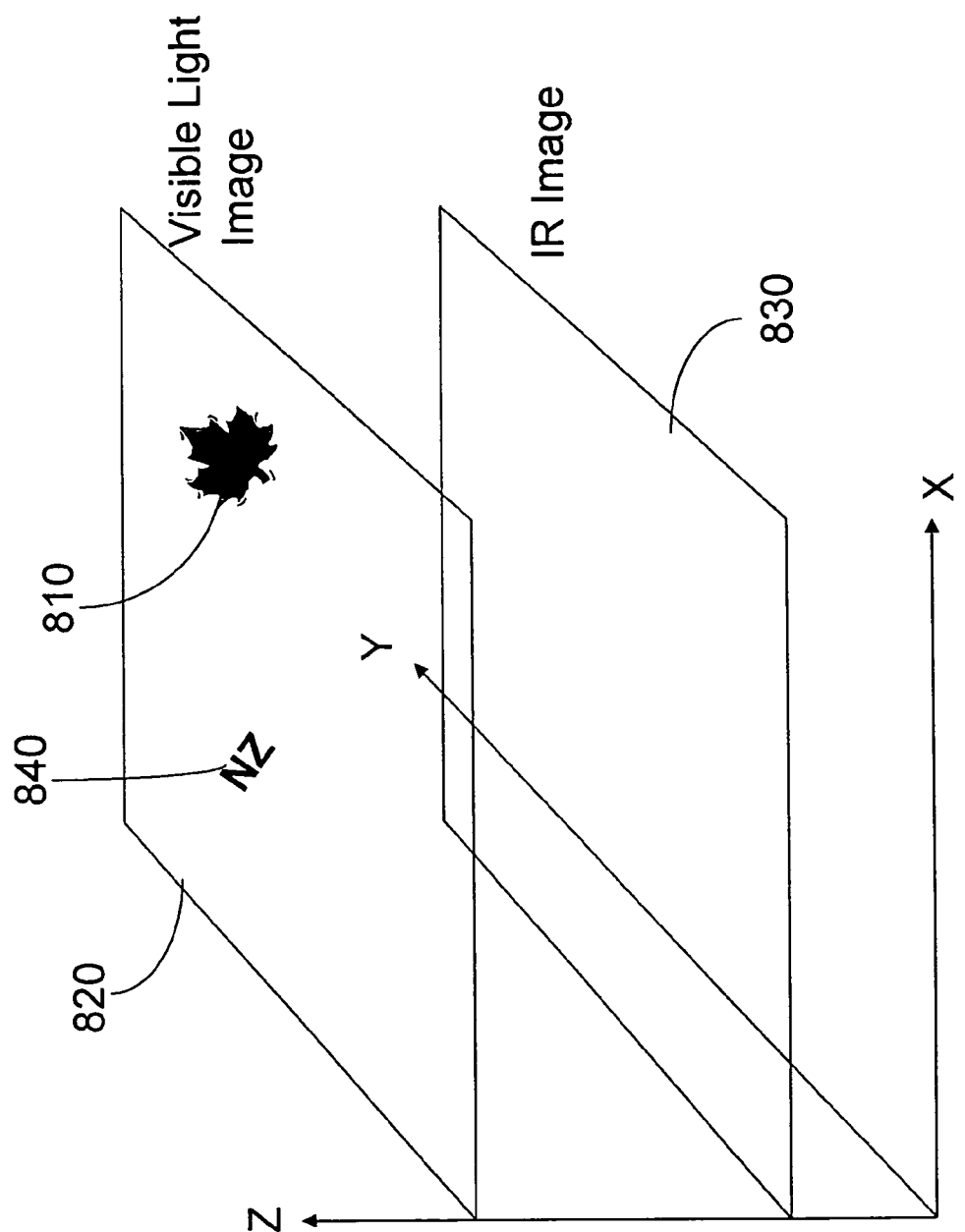
FIG. 8 depicts visible light and IR plane images from a typical security document.
Figure 9:
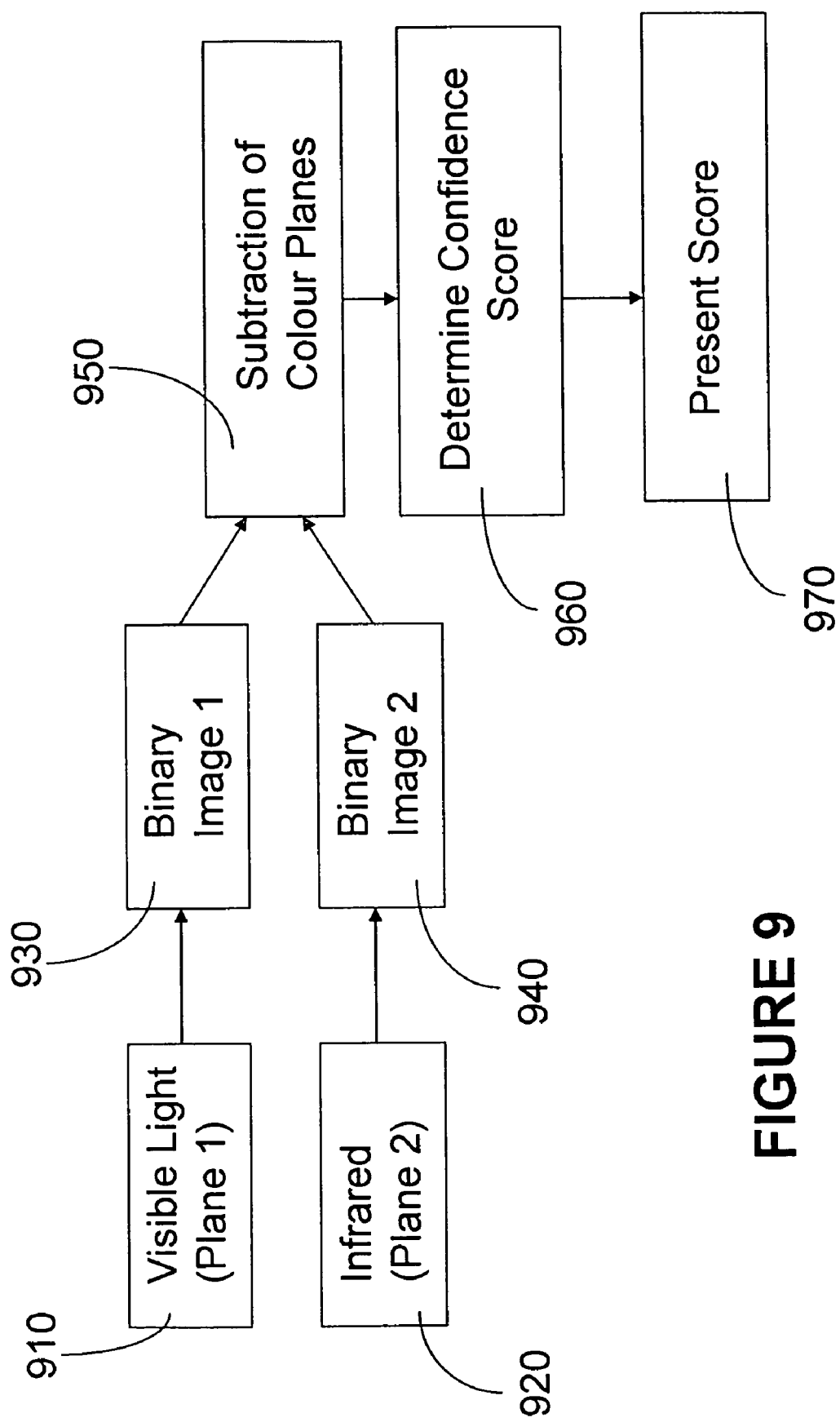
FIG. 9 depicts the cross plane comparison process of the present invention.

As highlighted in FIGS. 4B and 6B, one of the image features which is validated by DCS 100 includes a cross plane comparison feature. In general, this feature validation technique determines if a specific pattern (usually text) is present in a specific colour plane and that it is also present/absent in a different colour plane. As shown diagrammatically in FIG. 8, the most common pattern (e.g. maple leaf 810) is present in the visible plane 820 and absent in the IR plane 830. As shown in FIG. 9, the approach in this feature validation technique is to expose a specified page in security document 140 to visible and IR light sources (steps 910, 920). The CMOS sensor in travel document reader 120 produces respective gray scale images, from which binary images (steps 930, 940) from both planes (e.g. visible and IR) are obtained by filtration and the application of the Otsu thresholding method (both of which will be described in more detail below). The difference between the two binary images is calculated at step 950 to determine if the pattern is present in both planes or only in one plane. At step 960, the confidence score is determined from the difference and at step 970 the confidence score is presented. In one embodiment, the confidence score is determined from a comparison of the difference with an expected value. The expected result may indicate that a document is considered to be valid only if the pattern is present in both planes or, alternatively, if the pattern is present in one plane but absent from the other. Alternatively, the confidence score may be determined from the difference according to a predetermined transfer function.

Template builder GUI 310 allows the user to attach the feature (e.g. maple leaf 810) to a base colour plane and to box the pattern to search for in other colour plane. In addition, template builder GUI 310 lets the user build the property that sets a colour plane to search in and allows the user to set the expected result of that search (i.e. pattern is found/pattern is not found). Finally, template builder GUI allows the user to add filter properties (as will be discussed below) that are performed on a certain colour plane. Document inspection engine 320 performs any filter properties applied to the feature followed by a thresholding routine (to be discussed below). Document inspection engine 320 then performs a subtraction of one colour plane from the other producing a difference. In one embodiment, the set of presence results are then compared with the set of expected results created in template builder GUI 310 and stored in knowledge base 300, to determine if they correspond. Inspector GUI 340 then displays a pass (i.e. 100 score) only if all the presence tests pass against the base colour plane. Otherwise a fail (i.e. 0 score) is shown to the operator. In another embodiment, the difference is input into a transfer function created in said template builder GUI 310 and stored in knowledge base 300 to determine a confidence score of between 0 and 100 which is then displayed in Inspector GUI 340.

Figure 10:
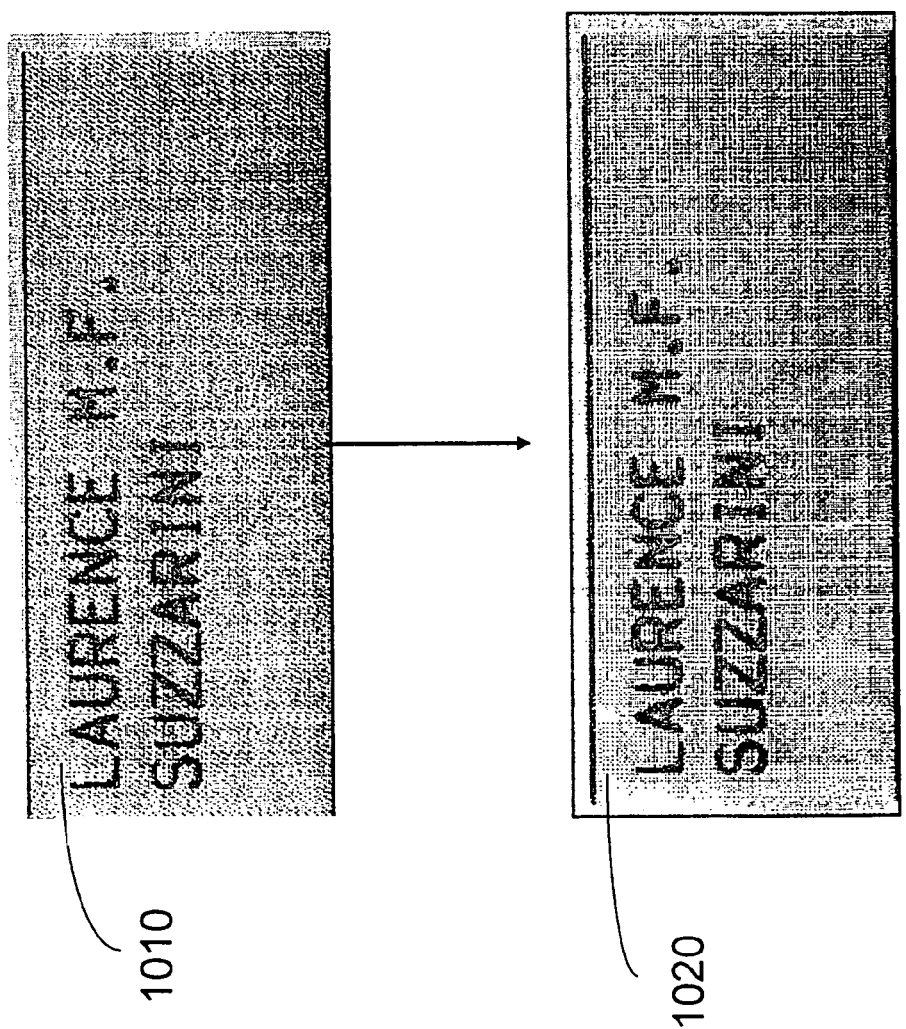
FIG. 10 depicts a sub image which has been filtered to remove the background.

As discussed above, steps 930 and 940 shown in FIG. 9 require a page in security document 140 which is exposed to two colour light sources, to be converted into respective binary images representative of each colour plane. Binary images in this context means that the foreground (e.g. maple leaf 810) is given one value (e.g. 1) and the background is given the other (e.g. 0). Creating a binary image is heavily dependent on the shape and consistency of the pattern in question. Therefore, the methodology chosen is very dependent on the available input image. If the foreground consists of text (e.g. letters 840), then the process is chosen in order to emphasize the text. Since text is often printed on a background that contains artifacts (e.g. thin diagonal lines) of its own, the first step in creating a binary image is to filter the background to remove the artifacts. By taking into account that the text is usually bigger in size than any item belonging to the background, a low pass filter is used to filter the background. For example, when a specified captured image was scanned, closely spaced diagonal lines in the background would have a high frequency while the large text would have a low frequency. The low pass filter would therefore remove the diagonal lines. Since the averaging filter is fast but it does not completely filter out the higher part of the spectrum, a Gaussian filter is used. Referring to FIG. 10, grey scale sub image 1010 is filtered such that the resulting image 1020 has the thin diagonal lines of the background removed. Alternately, if the user wants to study the background instead of the text, then a high pass filter or a band pass filter is applied that removes the text and any low frequency item.

The next step in creating a binary image is to threshold each of the gray scale images. The threshold value is calculated through the Otsu method, well known to those in the art. Otsu's method belongs to a group of algorithms aimed at maximizing the gray-scale variance between objects and background. The same technique is used e.g. in Reddi's, Mardi's, Kittler's and Illingworths method, all of which are meant to be included within the scope of the invention. In general, thresholding is a transformation of the input image "f" to an output (segmented) image "g" as follows, although it will be appreciated that there are many variants to this basic definition:

$$g(i, j) = \begin{cases} 1, & f(i, j) \geq T \\ 0, & f(i, j) < T \end{cases}$$

As those in the art will appreciate, thresholding is a form of segmentation. Segmentation is a process that maps an input image into an output image where each pixel in the input image is given a label indicating its membership in a group of pixels sharing some common property. Thresholding is a useful technique because it is a relatively simple method which can be performed rapidly in document inspection engine 320 of DCS 100.

Figure 11:
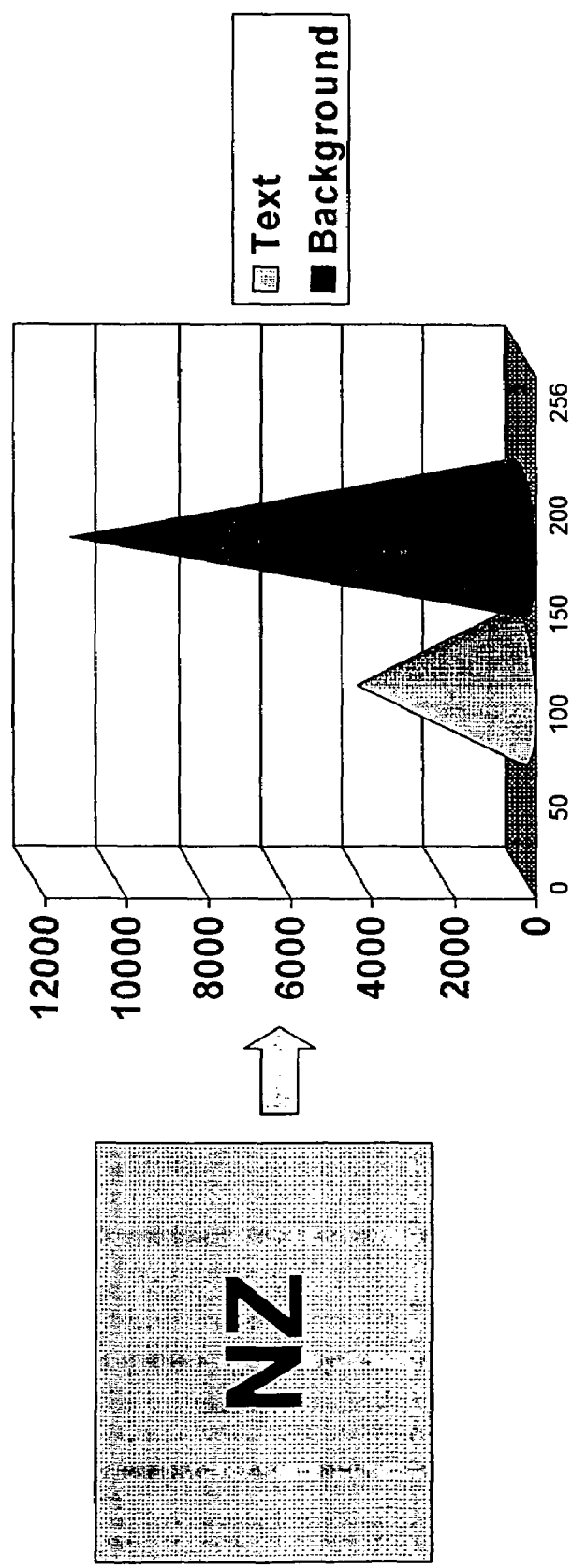
FIG. 11 depicts a filtered image to which the Otsu thresholding method has been applied.

Each image captured by the CMOS sensor is a grey scale image which is comprised of pixels. The Otsu thresholding method attempts to define two groups of pixels, background (which falls within a first range of values) and pattern or text (which falls within with a second range of values). As those skilled in the art are aware, the grey scale defines the brightness of a pixel expressed as a value representing it's lightness from black to white: Usually defined as a value from 0 to 255, with 0 being black and 255 being white. The Otsu thresholding method attempts to define two groups within this range, one representing background and the other representing text. FIG. 11 depicts a typical grey scale image obtained form a section of a specified colour plane containing text and background, and its associated histogram. As understood by those in the art, a histogram is a graphical representation of a frequency distribution. In FIG. 11, the frequency of background pixels falling within a first range of grey scale values is shown along with text pixels falling with a second range of grey scale values. In the figure, the demarcation point between text and background is relatively clear (i.e. the valley between to two groups at grey scale value 150). However, the threshold between background and text may not always be clear, as these two ranges often overlap to some extent. This occurs, for example, when one group has a wide distribution and the other a narrow one. The goal of the Otsu thresholding method is to minimize the error of classifying a background pixel as a text pixel or vice versa. To do this, the method seeks to minimize the area under the histogram for one group that lies on the other group's side of the threshold.

More specifically, the method considers the values in the two groups as two clusters. By making each cluster as tight as possible, their overlap is minimized. Since the distributions can't be changed, the method adjusts the threshold which separates them. As the threshold is adjusted one way, the spread of one cluster us increased and the spread of the other cluster is decreased. The goal of the method is to select the threshold that minimizes the combined spread.

The within-class variance is defined as the weighted sum of the variances of each cluster as:

$$\sigma_W^2(t) = q_1(t)\sigma_1^2(t) + q_2(t)\sigma_2^2(t)$$

where $$q_1(t) = \sum_{i=0}^{N} p(i)$$

and "N" is the number of intensity levels $$q_2(t) = \sum_{i=t}^{N-1} p(i)$$

$\sigma_1^2(t)$=the variance of the pixels in the first cluster (below threshold)
$\sigma_2^2(t)$=the variance of the pixels in the second cluster (above threshold)

The within-class variance is then subtracted from the total variance of the population to obtain the between-class variance:

$$\sigma_B^2 = \sigma^2 - \sigma_W^2(t)$$
$$= q_1(t)[\mu_1(t) - \mu]^2 + q_2(t)[\mu_2(t) - \mu]^2$$

where "σ" is the combined variance and "μ" is the combined mean. It is important to note that the between-class variance is simply the weighted variance of the cluster means themselves around the overall mean.

Substituting $\mu = q_1\mu_1 + q_2\mu_2$ and simplifying gives the following $$\sigma_B^2 = q_1(t)q_2(t)[\mu_1(t) - \mu_2(t)]^2$$

To summarize, for each potential threshold, the method:
(a) separates the pixels into clusters according to the threshold;
(b) finds the mean of each cluster;
(c) squares the difference between the means; and
(d) multiply the number of pixels in one cluster with the number in the other.

The optimal threshold is the one that maximizes the between-class variance (or conversely, minimizes the within class variance).

Figure 12:
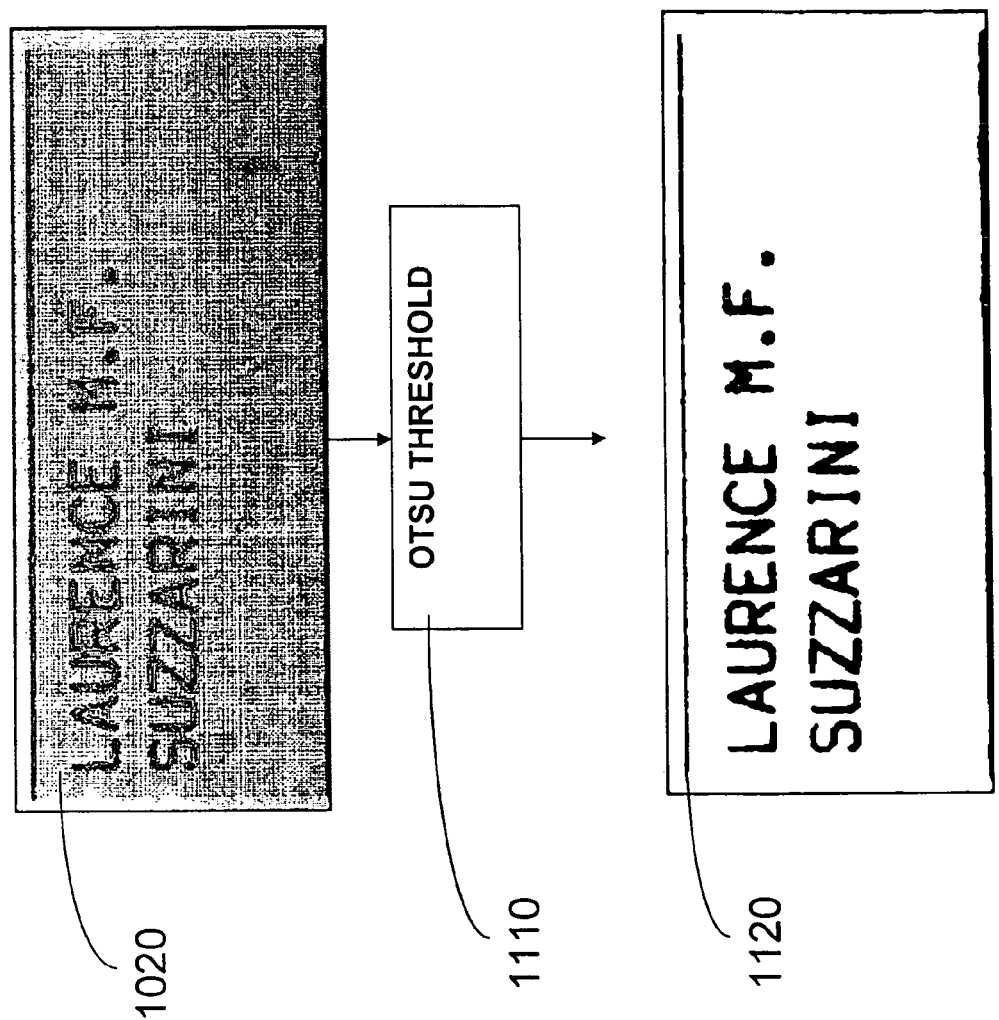
FIG. 12 depicts a typical grey scale image and its associated histogram.
Figure 13:
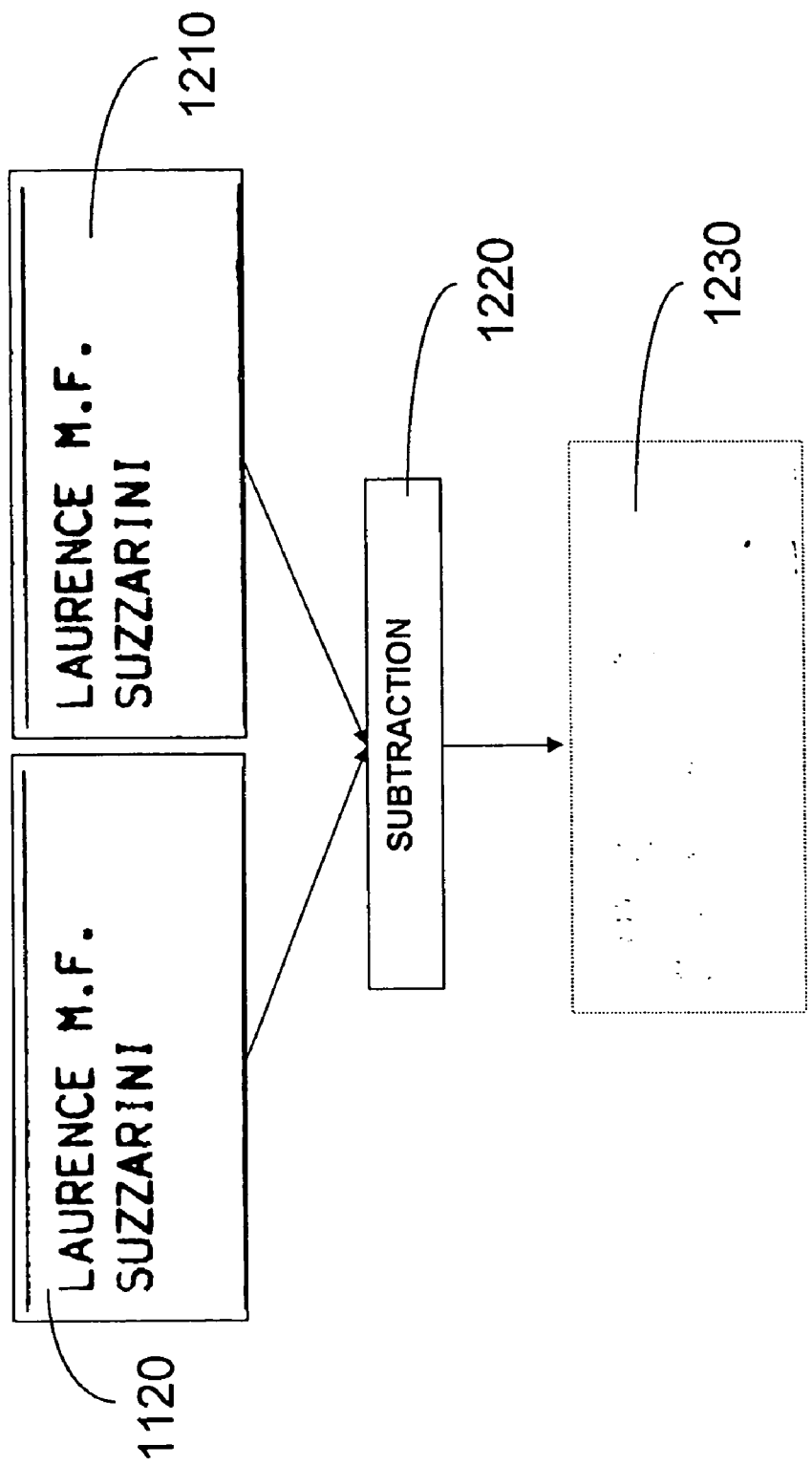
FIG. 13 depicts a first example of the cross plane presence/absence technique where a selected feature is present in both planes.

Referring to FIG. 12, filtered grey scale sub image 1020 is subjected to Otsu thresholding (shown at 1110) resulting in binary image 1120. As can be seen in binary image 1120, the grey background of filtered image 1020 has been removed. Referring now to FIG. 13, binary image 1120 (derived from a first colour plane e.g. visible light) is subtracted (shown at 1220) from a filtered binary image 1210 (derived from a second colour plane e.g. IR) to produce a final subtraction image 1230. In the example of FIG. 13, text is present in both planes under consideration such that the subtraction image 1230 should be blank. A number between 0 and 1 is determined from the resulting subtraction image 1230. To make this determination, the average grey scale level within subtraction image 1230 is calculated. In one embodiment, if this grey scale level is very small (Note: it is very unlikely to be equal to zero as there is always some noise left) then the difference between the images is considered to be equal to zero; otherwise it is considered to be equal to 1. In the example of FIG. 13, the result would be 0. As described in relation to FIG. 9, this value is then compared to an expected value stored in knowledge base 300. If the value matches then a score of 100 is presented to the operator in inspector GUI 340. Otherwise a score of 0 is presented. Thus, it will be readily appreciated that, in some instances, a valid document has the subject pattern in one plane only, in which case a grey scale level of 1 is expected. Conversely, in other instances, a valid document has the subject pattern in both planes, in which case a grey scale level of 0 is expected. In either case, a score of 100 is presented if the grey scale level indicates a valid document and a score of 0 is presented otherwise. In another embodiment, the average grey scale level calculated from the difference between the two binary images is inputted into a transfer function to provide a confidence score.

Figure 14:
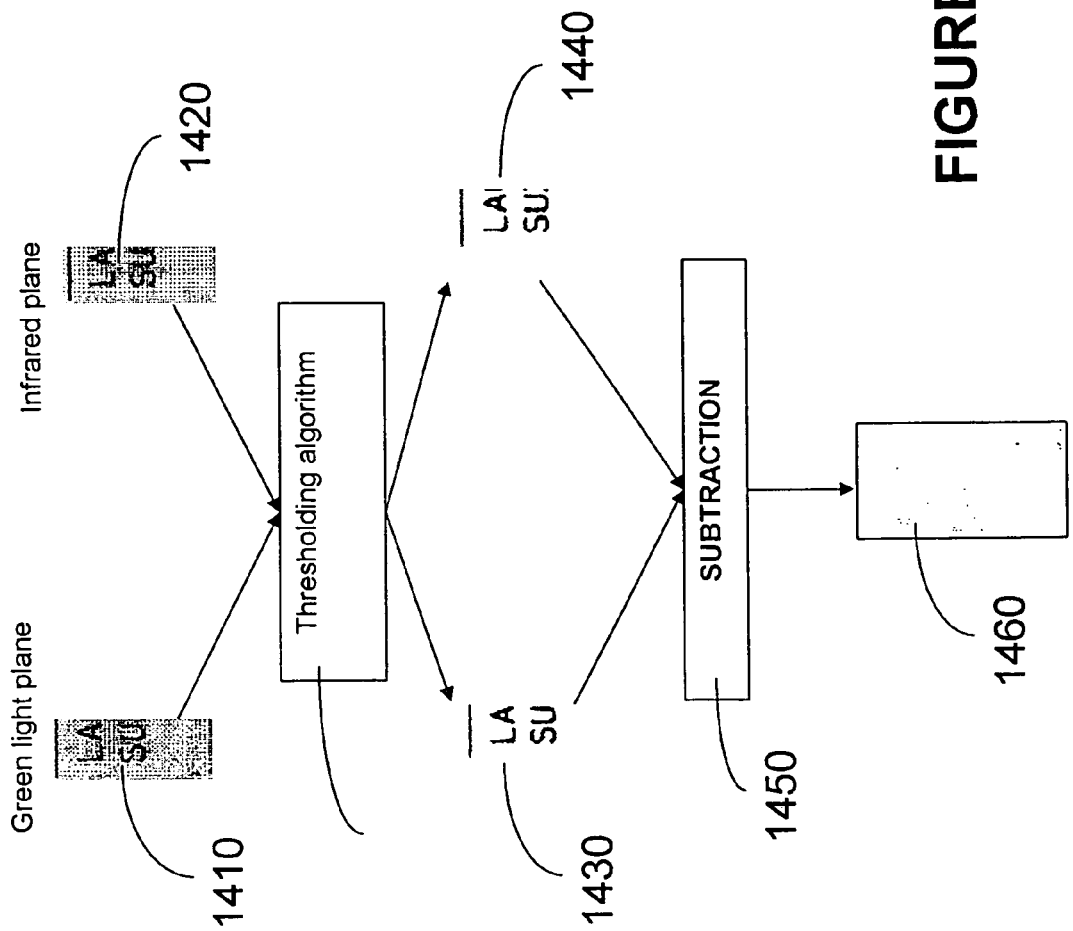
FIG. 14 depicts a second example of the cross plane presence/absence technique where a selected feature is present in both planes.

FIG. 14 is a further example of the cross plane comparison technique where selected features are present in two planes. Filtered grey scale sub images 1410 (derived from a first colour plane e.g. green light) and 1420 (derived from a second colour plane e.g. IR) are subjected to Otsu thresholding (shown at 1430) resulting in binary images 1440 and 1450. Binary image 1430 is subtracted (at 1450) from a binary image 1440 to produce a final subtraction image 1460. Like the previous example, text is present in both planes under consideration such that the subtraction image 1460 should be blank. A number (1 or 0) is determined from the resulting subtraction image 1460. In the example of FIG. 14, the result would be 0. This value is then compared to an expected value stored in knowledge base 300. If the value matches then a score of 100 is presented to the operator in inspector GUI 340. Otherwise a score of 0 is presented.

FIG. 15 is a further example of the cross plane comparison technique where selected features are present in one plane, but absent in another. Filtered grey scale sub images 1510 (derived from a first colour plane e.g. green light) and 1520 (derived from a second colour plane e.g. IR) are subjected to Otsu thresholding (shown at 1530) resulting in binary images 1540 and 1550. Binary image 1530 is subtracted (at 1550) from binary image 1540 to produce a final subtraction image 1560. Since the solid vertical band is only present in one image/plane, the subtraction image 1460 should include the solid vertical band. A number (1 or 0) is determined from the resulting subtraction image 1460. In the example of FIG. 15, the result would be 1. This value is then compared to an expected value stored in knowledge base 300. If the value matches then a score of 100 is presented to the operator in inspector GUI 340. Otherwise a score of 0 is presented.

In each of the above examples, an average grey scale level of 0 to 1 is calculated from a subtraction image and is compared to a defined threshold; the average grey scale level is then considered to be either 0 or 1 if it falls below or above, respectively, the defined threshold. More generally, a confidence score is calculated from the difference resulting from the subtraction image. For example, in some cases, a defined threshold which reliably indicates a match or the absence thereof cannot easily be determined. In such cases, a score of between 0 and 100 may be calculated and presented to the operator indicating a probability or degree of confidence that the expected features are present. For example, an average grey scale level of 0 to 1 may be calculated as described above representing the difference between the images. A score of between 0 and 100 may be calculated from this difference according to a transfer function previously determined by empirical measurement and analysis of known valid and invalid features of documents. The transfer function is selected to provide that an average grey scale level which indicates with certainty that the expected features are present produces a score of 100, whereas a score of 0 is produced by an average grey scale level which indicates with certainty that the expected features are not present. Intermediate average grey scale levels produce a score indicating a probability or degree of confidence that the expected features are present. By producing such a probability or confidence score, the disclosed system and method allow the operator or other system to combine the results of the cross plane comparison of a number of features to produce an aggregate probability or confidence score.

Although various exemplary embodiments of the invention have been disclosed, it should be apparent to those skilled in the art that various changes and modifications can be made which will achieve some of the advantages of the invention without departing from the true scope of the invention. In particular, the invention has been described in relation two colour planes, the images from which are processed and compared to an expected result stored in knowledge base 300. Alternately, images from multiple (i.e. 3 or more) colour planes could be captured and compared in the manner previously described to determine the presence/absence of a particular feature. In yet another embodiment, multiple images could be captured and two or more of the captured images combined before being compared to a further image to determine the presence/absence of a particular feature. All such alternate embodiments are meant to be included within the scope of the invention.

Embodiments of the method explained above can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. In a document comparison system having a document reader communicating with a document inspection engine, a method of performing cross plane comparison, comprising:
  (a) extracting a first image from a first colour plane of a specified page of a security document;
  (b) extracting a second image from a second colour plane of said specified page of said security document;
  (c) obtaining respective binary images from said first and second extracted images;
  (d) subtracting said respective binary images to determine a difference;
  (e) determining a confidence score from said difference; and
  (f) presenting said confidence score to an operator of said document comparison system on an inspector GUI.

2. The method according to claim 1 wherein said confidence score is determined from said difference by comparing said difference to an expected result stored in a knowledge base communicating with said document inspection engine.

3. The method according to claim 2 further comprising, prior to step (a), the steps of:
  building a template containing said expected result; and
  storing said template in said knowledge base.

4. The method of claim 2 wherein said first image is extracted by exposing said specified page of said security document to visible light from said document reader.

5. The method of claim 2 wherein said first image is extracted by exposing said specified page of said security document to infrared light utilizing said document reader.

6. The method of claim 2 wherein said first and second extracted images are first and second grey scale images comprising a plurality of pixels, and wherein each of said plurality of pixels has an associated grey scale value, and wherein each of said first and second grey scale images have a foreground and a background.

7. The method of claim 6 wherein step c) further comprises filtering artifacts from said first and second grey scale backgrounds.

8. The method of claim 7 wherein said step of filtering comprises applying a low pass filter to said first and second grey scale images.

9. The method of claim 8 wherein said low pass filter is a Gaussian filter.

10. The method of claim 6 wherein step c) further comprises thresholding said first and second grey scale images.

11. The method of claim 10 wherein said step of thresholding comprises determining a threshold value for distinguishing, in each of said first and second grey scale images, between said foreground and said background.

12. The method of claim 10 further comprising assigning said foreground a value of 1 and said background a value of 0.

13. The method of claim 10 wherein said step of thresholding said first and second grey scale images comprises applying an Otsu thresholding methodology.

14. The method of claim 2 wherein step d) further comprises obtaining a subtraction image, calculating an average grey scale level associated with said subtraction image, and wherein, if said average grey scale level is below a defined threshold, said difference equals 0, else said difference equals 1.

15. The method of claim 14 wherein said confidence score is determined to be 100 if said difference matches said expected value, and said confidence score is determined to be 0 if said difference does not match said expected value.

16. The method of claim 1 wherein step d) further comprises obtaining a subtraction image, calculating an average grey scale level associated with said subtraction image, determining said difference from said average grey scale value, and determining said confidence score from said difference according to a previously determined transfer function.

17. A document comparison system comprising:
  (a) a knowledge base;
  (b) a document inspection engine communicating with said knowledge base for performing cross plane comparison, wherein said cross plane comparison comprises:
    (i) extracting a first image from a first colour plane of a specified page of said security document;
    (ii) extracting a second image from a second colour plane of said specified page of said security document;
    (iii) obtaining respective binary images from said first and second extracted images;
    (iv) subtracting said respective binary images to determine a difference; and
    (v) determining a confidence score from said difference; and
  (d) an inspector graphical user interface for presenting said confidence score to an operator.

18. The apparatus of claim 17 wherein said confidence score is determined from said difference by comparing said difference to an expected result stored in a knowledge base communicating with said document inspection engine.

19. The apparatus of claim 18 further comprising a template builder graphical user interface for building a template associated with said security document, and wherein said template is stored in said knowledge base, and wherein said template contains said expected result.

20. The apparatus of claim 17 further comprising a document reader communicating with said document inspection engine for extracting said first and second images.

21. The apparatus of claim 20 wherein said document reader comprises a light source, and wherein said first image is extracted by exposing said specified page of said security document to visible light, and wherein said second image is extracted by exposing said specified page of said security document to infrared light.

22. The apparatus of claim 17 further comprising a low pass filter for removing artifacts from a background of said respective first and second extracted images.

23. A computer-readable medium having stored thereon, computer-executable instructions which, when acted on by a document inspection engine, cause the document inspection engine to:
  a) extract a first image from a first colour plane of a specified page of a security document, utilizing a reader communicating with said document inspection engine;
  b) extract a second image from a second colour plane of said specified page of said security document, utilizing said reader communicating with said document inspection engine;

(c) obtain respective binary images from said first and second extracted images;

(d) subtract said respective binary images to determine a difference;

(e) determine a confidence score from said difference; and (f) present said confidence score to an operator of said document comparison system on an inspector GUI.

24. The computer-readable medium of claim 23 wherein said confidence score is determined from said difference by comparing said difference to an expected result stored in a knowledge base communicating with said document inspection engine.

25. The computer-readable medium of claim 24 wherein said expected result is contained in a template associated with said security document, and wherein said template is stored in said knowledge base.

* * * * *

UNITED STATES PATENT AND TRADEMARK OFFICE
CERTIFICATE OF CORRECTION

PATENT NO. : 7,630,520 B2 Page 1 of 1
APPLICATION NO. : 11/496381
DATED : December 8, 2009
INVENTOR(S) : Visan et al.

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 677 days.

Delete "677 days" and insert -- 800 days --.

Column 7
Line 35 delete "7B" and insert therefor -- 7C --.

Column 9
Line 54 delete "form" and insert therefor -- from --.

Column 10
Line 10 delete "us" and insert therefor -- is --.

Column 14
Line 33 delete "(d)" and insert therefor -- (c) --.

Column 14
Line 37 delete "a" and insert therefor -- said --.

Signed and Sealed this

Twenty-seventh Day of July, 2010

David J. Kappos
*Director of the United States Patent and Trademark Office*